(12) United States Patent
Paul et al.

(10) Patent No.: US 9,772,109 B2
(45) Date of Patent: Sep. 26, 2017

(54) PROCESS FOR ENABLING CARBON-CAPTURE FROM CONVENTIONAL STEAM METHANE REFORMER

(71) Applicant: PHILLIPS 66 COMPANY, Houston, TX (US)

(72) Inventors: Uchenna Prince Paul, Bartlesville, OK (US); David Brooke Ingram, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 396 days.

(21) Appl. No.: 13/937,376

(22) Filed: Jul. 9, 2013

(65) Prior Publication Data

US 2014/0023975 A1   Jan. 23, 2014

Related U.S. Application Data

(60) Provisional application No. 61/673,021, filed on Jul. 18, 2012.

(51) Int. Cl.
*F23L 7/00* (2006.01)
*F23J 15/02* (2006.01)
*C01B 3/38* (2006.01)
*C01B 13/02* (2006.01)

(52) U.S. Cl.
CPC .............. *F23L 7/007* (2013.01); *C01B 3/384* (2013.01); *C01B 13/0233* (2013.01); *F23J 15/02* (2013.01); *C01B 2203/0811* (2013.01)

(58) Field of Classification Search
CPC . F23J 15/02; F23L 7/007; C01B 3/384; C01B 13/0233; C01B 2203/0811
USPC .......................... 431/12; 110/345; 423/437.1
See application file for complete search history.

(56) References Cited

U.S. PATENT DOCUMENTS

| 5,888,272 A * | 3/1999 | Prasad | B01D 53/22 95/45 |
| 2002/0073938 A1 | 6/2002 | Bool, III et al. | |
| 2007/0041894 A1* | 2/2007 | Drnevich | B01J 8/009 423/650 |
| 2011/0296872 A1* | 12/2011 | Eisenberger | B01D 53/04 62/640 |

FOREIGN PATENT DOCUMENTS

| EP | 0984500 | 3/2000 |
| WO | 2006112725 | 10/2006 |

OTHER PUBLICATIONS

Meixner, et al., Electrochemical Oxygen Separation Using Solid Electrolyte Ion Transport Membranes, Journal of the Electrochemical Society 2002; 149(9): D132-D136.*
J.W. Phair, S.P.S. Badwal, "Materials for Separation Membranes in Hydrogen and Oxygen Production and Future Power Generation", Science and Technology of Advanced Materials 7, 2006, pp. 792-805.

(Continued)

*Primary Examiner* — Daniel C McCracken
(74) *Attorney, Agent, or Firm* — Phillips 66 Company

(57) ABSTRACT

A process of producing a feed form a solid electrolyte oxygen separator and combusting the feed in a steam methane reforming furnace to produce a flue gas.

9 Claims, 4 Drawing Sheets

(56) References Cited

OTHER PUBLICATIONS

PCT Notification of Transmittal of the International Search Report and the Written Opinion of the International Searching Authority, or the Declaration, International Application No. PCT/US2013/050450, International Filing date: Jul. 15, 2013, 13 pages.

* cited by examiner

PROCESS FOR ENABLING CARBON-CAPTURE FROM CONVENTIONAL STEAM METHANE REFORMER

CROSS-REFERENCE TO RELATED APPLICATIONS

This application is a non-provisional application which claims the benefit of and priority to U.S. Provisional Application Ser. No. 61/673,021 filed Jul. 18, 2012, entitled "Process for Enabling Carbon-Capture from Conventional Steam Methane Reformer," which is hereby incorporated by reference in its entirety.

STATEMENT REGARDING FEDERALLY SPONSORED RESEARCH OR DEVELOPMENT

None.

FIELD OF THE INVENTION

This invention relates to a process for enabling carbon-capture from conventional steam methane reforming.

BACKGROUND OF THE INVENTION

Refineries use large quantities of hydrogen in daily operations. Hydrogen is currently produced mainly via steam methane reforming (SMR). SMR has associated $CO_2$ emissions that has been identified as an area for potential reduction of greenhouse gas emissions within refineries.

Technologies such as amine scrubbing can remove $CO_2$ from process gas streams, such as the gaseous waste stream from a SMR unit. Heat for the endothermic process is typically provided by combustion of natural gas and/or high BTU process streams (for example fuel gas or pressure swing absorber offgas) using air as the oxidant. Because the natural gas is burned in the presence of air, the exiting flue gas comprises mostly nitrogen. While the concentration of $CO_2$ in the flue gas is relatively low, the flow rate is large, such that approximately 50% of the $CO_2$ produced during SMR is emitted during combustion. The balance of the $CO_2$ comes from the reforming reaction itself and is produced in a stream with a relatively high $CO_2$ partial pressure (typically around 45 psia), such that the $CO_2$ can be effectively captured using amine scrubbing technology. On the other hand, the combustion flue gas stream is mostly nitrogen, thus it is cost prohibitive to size an amine scrubber to process the entire stream. The result is an upper limit to how much $CO_2$ could be captured practically from a conventional SMR unit. This could have a significant impact on the economics of a SMR unit if $CO_2$ emission taxes, incentives, and/or caps were imposed.

One way that others have proposed to solve this problem is by using an oxygen-fuel combustion process within the SMR furnace. In oxygen-fuel combustion process, the furnace fuel is combusted in the presence an oxygenated environment rather than air. The resulting flue gas primarily consists of $CO_2$ and $H_2O$ with very little nitrogen. The $H_2O$ in the flue gas is easily removed through condensation, leaving a stream of concentrated $CO_2$ that is ready for compression, transportation and sequestration. This process greatly increases the amount of $CO_2$ that could be captured practically from a SMR plant.

One of the largest obstacles in operating an oxygen-fuel combustion process within the SMR boiler furnace is obtaining oxygen. Typically, the only proposed method of obtaining oxygen to an SMR plant is the use of an air separation unit. The problems with air separation units is that they typically separate oxygen and nitrogen from air through a cryogenic separation process, which has large capital, operating costs and $CO_2$ footprint associated.

There exists a need to produce oxygen in high quantities and purity in a safe and cost effective manner to operate with an oxygen-fuel combustion process within a SMR furnace.

BRIEF SUMMARY OF THE DISCLOSURE

A process of producing a feed from a solid electrolyte oxygen separator and combusting the feed in a steam methane reforming furnace to produce a flue gas.

In an alternate embodiment the process describes producing a feed from a solid electrolyte oxygen separator consisting essentially of oxygen. The feed is then combusted with a fuel in an oxygen-fuel steam methane reforming furnace to produce a flue gas containing less than 50 wt % nitrogen. The $CO_2$ is then captured from the flue gas.

In yet another embodiment the process describes producing a feed from a solid electrolyte oxygen separator containing greater than 99 wt % oxygen. The feed is then combusted with a fuel in an oxygen-fuel steam methane reforming furnace to produce a flue gas containing less than 1 wt % nitrogen. The $CO_2$ is then directly captured from the flue gas post combustion without undergoing a nitrogen separation step.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The following examples of certain embodiments of the invention are given. Each example is provided by way of explanation of the invention, one of many embodiments of the invention, and the following examples should not be read to limit, or define, the scope of the invention.

Any conventionally used and/or known SMR system can be used. Generally, SMR processes can be described by two main reactions:

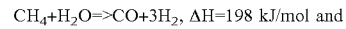

$CH_4 + H_2O \Rightarrow CO + 3H_2$, $\Delta H = 198$ kJ/mol and

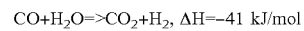

$CO + H_2O \Rightarrow CO_2 + H_2$, $\Delta H = -41$ kJ/mol

The first reaction is reforming, while the second is a water-gas shift reaction. Since the overall reaction is endothermic, some heat input is required. Typically, this was accomplished by the combustion of natural gas or other fuels in a direct fired furnace.

Figure 1:
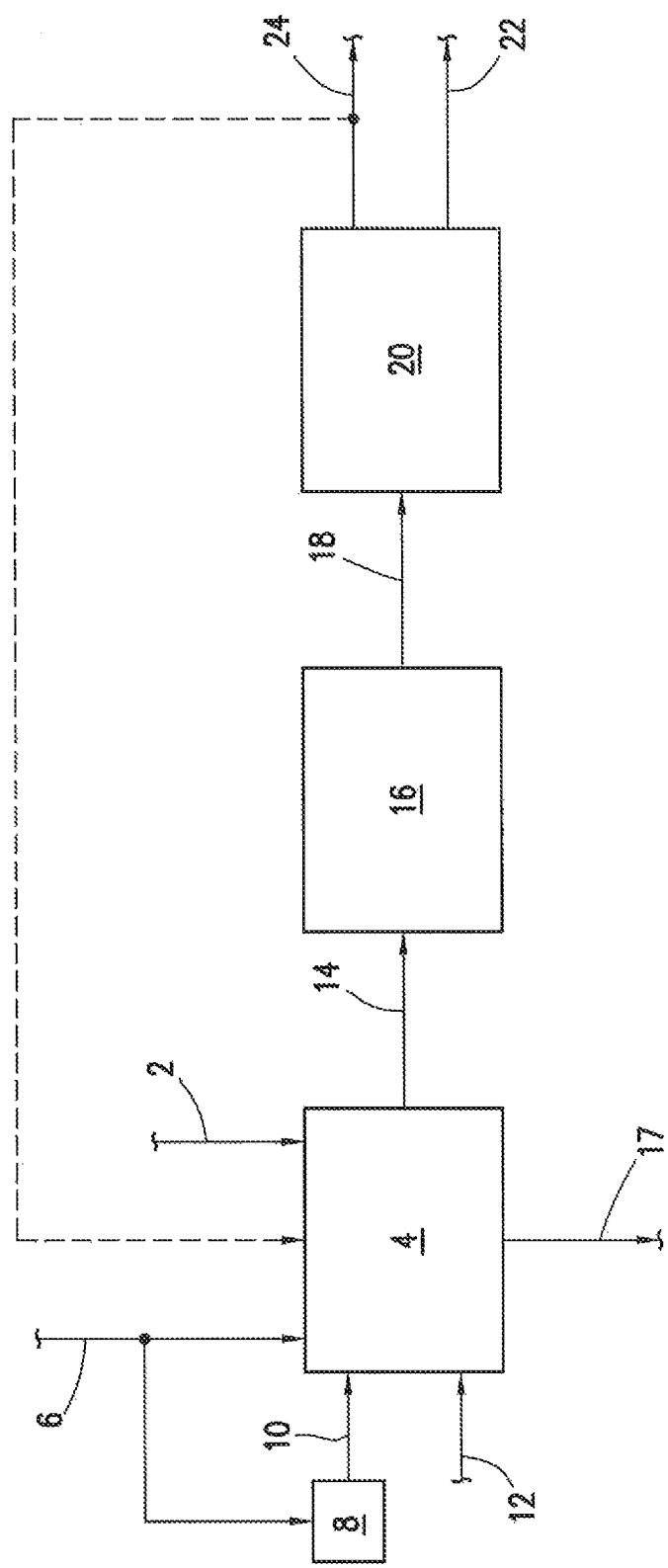
FIG. 1 depicts a conventional SMR system.

FIG. 1 depicts a representative SMR furnace wherein a pre-heated mixture of natural gas and steam is passed through catalyst-filled tubes. Also in this figure air 2 flows into a steam reformer 4 and is used to combust part of the natural gas feed outside of the reformer tubes. Additionally, while natural gas is a typical hydrocarbon that can be fed into the steam reformer, it is known and envisioned that other light hydrocarbons, such as methane, naphtha, butane, liquid petroleum gas, fuel gas, natural gas liquids, pressure swing absorber offgas, biogas, or refinery feedstock, can be utilized as a carbon feedstock for the steam reformer.

In some designs the natural gas 6 undergoes contaminants removal to remove contaminants such as sulfur prior to being fed into the steam reformer 4. In FIG. 1, the contaminate removal 8 can remove contaminates to produce a purified natural gas 10. Additionally, steam 12, in this figure, was also fed into the steam reformer 4.

The steam reformer 4 produces both effluent gas 14 and flue gas 17. Optionally, the effluent gas 14 can be further reacted in reactor 16 to produce more hydrogen and carbon dioxide. The reaction that takes place in reactor 16 is typically a water-gas shift reaction to produce shifted effluent gas 18.

The shifted effluent gas 18 then undergoes pressure swing adsorption 20 wherein $H_2$ 22, is separated from the other product gases 24 consisting primarily $CO_2$, high BTU fuel gases, and other gases including nitrogen, argon or other chemicals and gases present in the original reaction from the steam reformer 4. A slipstream of these other gases 24 can flow back into the SMR furnace 4.

As shown in Table 1 the $CO_2$ content of the gas stream is typically less than

| Gas Stream | Typical $CO_2$ content |
| --- | --- |
| Effluent gas after SMR | 5-10% |
| Shifted effluent gas after Water Gas Shift | 10-20% |
| Shifted effluent gas after Pressure Swing Adsorption | 40-50% |

Under this design the flue gas 17 would have a high amount of nitrogen. This is due to air 2 typically containing around 78% nitrogen.

In one embodiment the steam methane reforming furnace is an oxygen-fuel steam methane reforming furnace.

The present embodiment describes a process for producing a feed from a solid electrolyte oxygen separator (SEOS) and combusting the feed in a steam methane reforming furnace to produce a flue gas.

Figure 2:
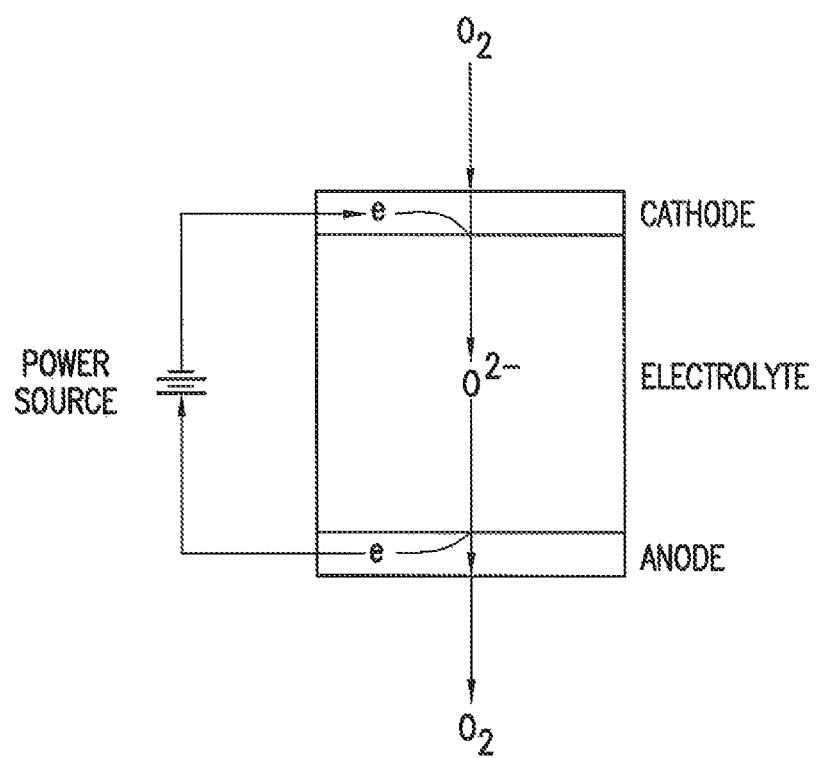
FIG. 2 depicts a schematic diagram of a solid electrolyte oxygen separator.

The SEOS can be any conventionally known or used solid electrolyte oxygen separator. A schematic diagram of a SEOS cell is shown in FIG. 2.

Typically in a SEOS, air is supplied to the cathode side of the SEOS. The cathode electrocatalyst then uses electrons to reduce the $O_2$ molecules in the air to $O^{2-}$ anions.

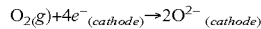

The voltage difference between the cathode and the anode acts to "pump" the $O^{2-}$ anions across the electrolyte to the anode.

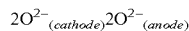

Ions are then oxidized back to form gaseous $O_2$ molecules, and release electrons to the electrical circuit.

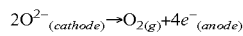

Each oxygen molecule that is effectively transported from cathode to anode requires that four electrons flow through the external circuit; therefore, the desired $O_2$ production rate dictates the necessary electrical current flowing through the cell. The efficiency of the SEOS materials (anode, electrolyte and cathode) at performing the reactions above dictates the achievable current density (current divided by electrode area). It is theorized that a higher current density should result in a decreased capital cost for operating the SEOS.

The power required to operate the SEOS unit would be a product of the current and the necessary applied voltage. Thus, if the SEOS can be operated at a low voltage for a given current, then the power consumed to produce purified $O_2$ will be relatively low. To produce a stream of pure $O_2$ at a pressure of 1 atm, it is estimated that the minimum voltage required to drive oxygen anions from the cathode, which is in contact with air at 1 atm, to the anode, which has a higher oxygen chemical potential due to its contact with pure oxygen is 36.1 mV when operating at a temperature of 800° Celsius. The Nernst equation can be used to estimate the minimum required voltage at different pressures or temperatures.

In one embodiment the production of the oxygen in the SEOS occurs in ambient pressure.

Figure 3:
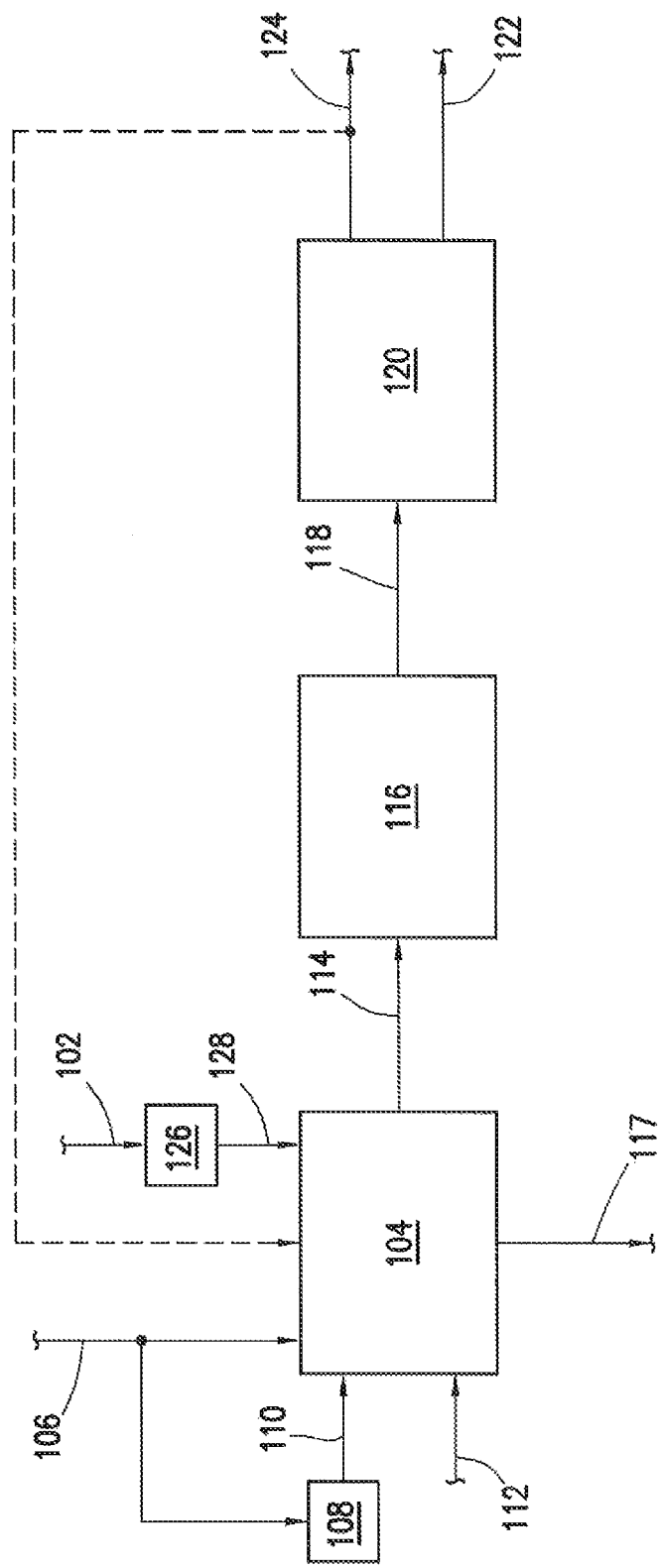
FIG. 3 depicts an embodiment of the novel process.

The present process has the SEOS upstream of the SMR furnace. FIG. 3 depicts one embodiment of this process wherein air 102 is put through a SEOS 126 to produce a feed 128 containing oxygen. In one embodiment the SEOS feed produces 95 wt %, 99 wt %, even 100 wt % oxygen.

FIG. 3 depicts an embodiment wherein the feed 128 is directly flowed into the SMR furnace 104. As stated above the fuel 106 for this SMR furnace can be any conventional light hydrocarbons, such as methane, biogas or refinery feedstock. As shown in FIG. 3, the contaminate removal 108 can also remove contaminates to produce a purified fuel 110.

In one embodiment steam 112, can also be an input into the SMR furnace.

The outputs for the SMR furnace would then be effluent 114 and flue gas 117. Dependent upon the oxygen concentrations of the inputs into the SMR furnace 104 the flue gas 117 can contain less than 50 wt %, 25 wt %, 10 wt %, 5 wt %, 1 wt %, even no nitrogen. Due to these low amounts of nitrogen emitted from the SMR furnace in one embodiment the flue gas would not have to undergo any subsequent nitrogen separation step.

The effluent 114 can then go undergo a conventional water-gas shift reaction 116 to produce shifted effluent 118. This shifted effluent 118 can then undergo $H_2$ purification (for example, with a pressure swing adsorption 120) to separate $H_2$ 122, from the product gases 124 consisting primarily $CO_2$, high BTU fuel gases, and other gases including nitrogen, argon or other chemicals and gases present in the original reaction in the steam reformer 104. A slipstream of these other gases can flow back into the SMR furnace 104.

These other gases 124 could be recycled into the reformer 104 to be combusted with the oxidant feed from the SEOS. Consequently, all the $CO_2$ from reformer is now concentrated in stream 117. It is theorized that this stream will contain about 80% $CO_2$ with the remainder being mostly water.

In another embodiment, a slipstream of flue gas 117 can be recycled and added as a diluent to the feed 128 in order to reduce the flame temperature upon combustion in the SMR furnace, hence minimizing the use of costly refractory materials in the SMR furnace without introduction of other diluents that would decrease the CO2 concentration in the exiting flue gas 117.

Figure 4:
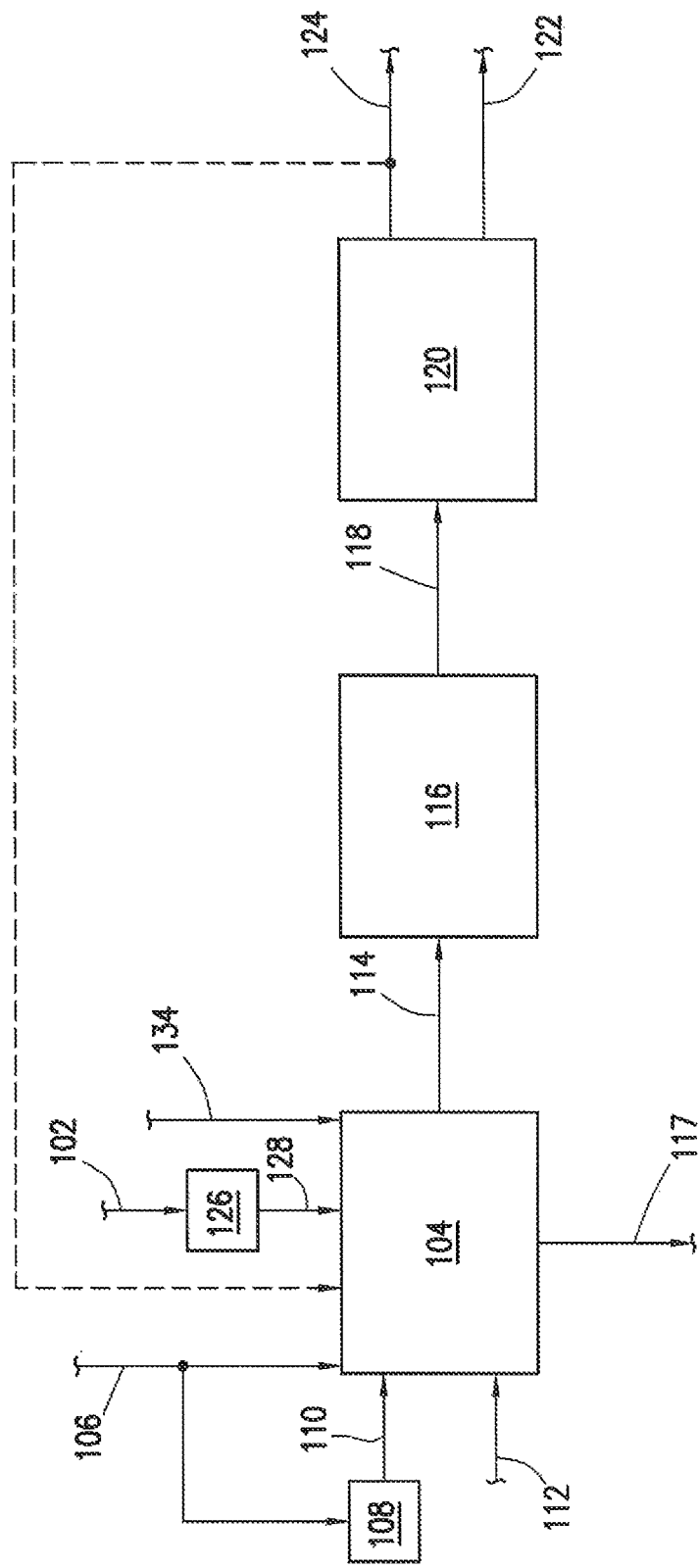
FIG. 4 depicts an embodiment of the novel process.

FIG. 4 depicts another embodiment as a variation of FIG. 3 wherein the feed 128 is not the only source of oxygen for the SMR furnace 104. In this embodiment FIG. 4 depicts how optional inlet can be used to flow air 134 into the SMR furnace 104. In this embodiment a flow regulator can be used to vary the amount of air 134 added to the SMR furnace 104. This amount of air 134 compared to the feed 128 added can vary up to 1 wt %, 5 wt %, 10 wt %, 25 wt %, 50 wt %, 90 wt % even 99 wt % air.

The feed can flow into the SMR furnace in a variety of ways. FIG. 4 depicts an embodiment wherein the feed 128 is directly flowed into the SMR furnace 104. In other embodiments it is also envisioned that the feed 128 can be mixed with air 134 prior to flowing into the SMR furnace 104. In yet other embodiments it is also envisioned that steam 112 can be mixed with the feed 128 or with air 134 or with both the feed 128 and the air 134 prior to flowing into the SMR furnace 104. It is also possible that the fuel 106 or the purified fuel 110 be mixed into a joint pipe prior to flowing into the SMR furnace 104. In one embodiment it is possible that the fuel 106, the purified fuel 110, slipstream of other product gases 124 or the joint pipe flowing both purified fuel and fuel and other product gases 124 be mixed with either steam 112, feed 128, slipstream of flue gas 117 or air 134 prior to flowing into the SMR furnace.

Optionally, in all the embodiments, flow regulators can be used along each of the individual pipelines to vary the amounts of fuel, feed, feed-fuel mixtures, steam, air and any other inlet pipes into the SMR furnace. Additionally, any other conventionally known chemical, gas, solid, or liquid can be added to the SMR furnace, in its own pipeline or jointly added with another pipeline, to enhance its operability by one skilled in the art.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process comprising:
   producing a feed from a solid electrolyte oxygen separator; and
   combusting the feed in a steam methane reforming furnace to produce a flue gas
   wherein air is added to the steam methane reforming furnace and the feed is mixed with natural gas and air prior to combustion by the steam methane reforming furnace.

2. The process of claim 1, wherein the steam methane reforming furnace is an
   oxygen-fuel steam methane reforming furnace.

3. The process of claim 1, wherein the flue gas contains less than 50 wt % nitrogen.

4. The process of claim 1, wherein the flue gas contains less than 10 wt % nitrogen.

5. The process of claim 1, wherein the flue gas does not contain any nitrogen.

6. The process of claim 1, wherein the flue gas undergoes $CO_2$ capture.

7. The process of claim 1, wherein the flue gas does not undergo any subsequent nitrogen separation step.

8. The process of claim 1, wherein the feed produced from the solid electrolyte oxygen separator contains greater than 95 wt % oxygen.

9. The process of claim 1, wherein the feed produced from the solid electrolyte oxygen separator is 100 wt % oxygen.

* * * * *